(No Model.)

S. FOX.
STUFFING BOX OR PACKING CHAMBER.

No. 279,642. Patented June 19, 1883.

Witnesses:
N. E. Oliphant
H. B. Zevely

Inventor:
Samuel Fox,
per Chas. H. Fowler
Attorney

UNITED STATES PATENT OFFICE.

SAMUEL FOX, OF TOLEDO, OHIO.

STUFFING-BOX OR PACKING-CHAMBER.

SPECIFICATION forming part of Letters Patent No. 279,642, dated June 19, 1883.

Application filed December 6, 1882. (No model.)

*To all whom it may concern:*

Be it known that I, SAMUEL FOX, a subject of the Queen of Great Britain, residing at Toledo, in the county of Lucas and State of Ohio, have invented certain new and useful Improvements in a Stuffing-Box or Packing-Chamber; and I do hereby declare that the following is a full, clear, and exact description of the same, reference being had to the annexed drawings, making a part of this specification, and to the letters and figures of reference marked thereon.

Figure 1:
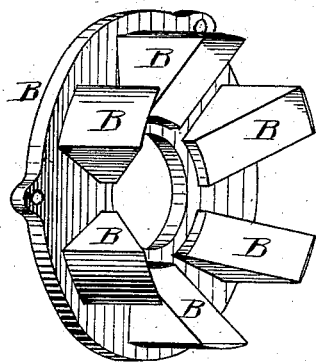
Figure 2:
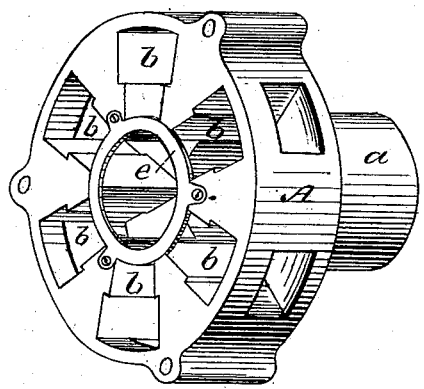
Figure 3:
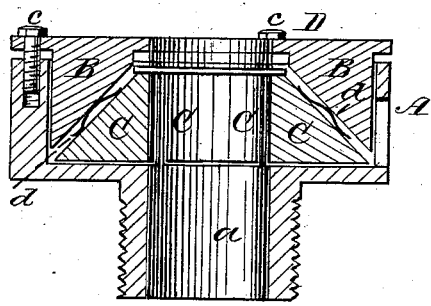
Figure 4:
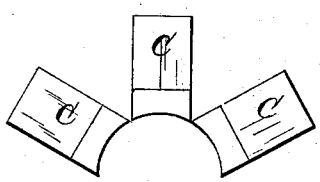

Figure 1 of the drawings is a perspective view of the cap, having a series of wedges cast thereon; Fig. 2, a similar view of the packing-chamber or stuffing-box with the cap removed. Fig. 3 is a sectional elevation of the various parts of my invention when connected together, and Fig. 4 a detail view of the metallic packing.

The present invention refers to certain new and valuable improvements in stuffing-boxes or packing-chambers provided with metallic packing to be used for piston-rods, plungers, hydraulic rams and elevators, &c.

The object of the invention is to provide an efficient means for packing such rods, which will economize space in the direction of the length thereof and permit the ready adjustment and renewal of the packing and providing against leakage. These several objects I attain in a successful and thorough manner by the construction substantially as shown in the drawings, hereinafter described, and claimed.

In the accompanying drawings, A represents the stuffing-box or casing, preferably cast with a suitable sleeve, $a$, to a barrel or cylinder or other containing-vessel. The stuffing box or casing A has concentric grooves $b$, for the reception of the wedges B and packing C, as shown in Fig. 3, the planes of said packing conforming to the planes of the wedges. The wedges B are preferably cast with the cap D, said cap being placed over the stuffing box or casing and drawn down upon its bearings by suitable screws or bolts, $c$. Between the wedges B and packing C are located suitable springs, $d$, to render the packing elastic and to modify the pressure, a confining-ring, $e$, being connected to the stuffing box or casing by screws or other suitable means, to hold or confine the packing to the line of its motion. The tendency of the wedges B is to compress the packing upon all sides of the plunger, rod, or shaft alike, thus holding it upon its proper center line.

In the case of a vertical plunger the springs $d$ may be made of a uniform strength; but for a horizontal rod or shaft the springs upon the lower half should be strengthened to counteract the sagging of said rod or shaft.

Having now fully described my invention, what I claim as new, and desire to secure by Letters Patent, is—

A stuffing box or casing having a series of concentric grooves, in combination with a series of packing-blocks placed therein, and a cap secured over said stuffing box or casing, and having a series of wedges located within the slots and adapted to propel the packing-blocks in a lateral direction toward the rod or plunger, substantially as and for the purpose set forth.

In testimony that I claim the above I have hereunto subscribed my name in the presence of two witnesses.

SAMUEL FOX.

Witnesses:
N. E. OLIPHANT,
H. B. ZEVELY.